Jan. 5, 1965 L. A. ROWELL ETAL 3,164,548
TOWER TYPE PNEUMATIC SEPARATOR
Filed June 19, 1961 2 Sheets-Sheet 1

INVENTORS
L.A. ROWELL
P. A. TILLICH

Fetherstonhaugh & Co.
ATTORNEYS

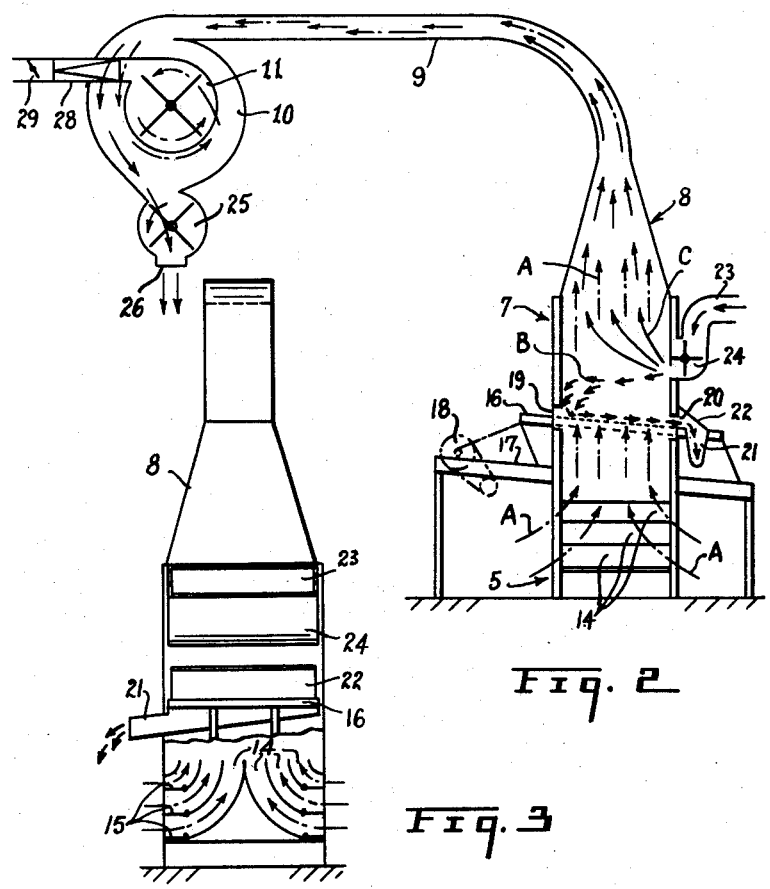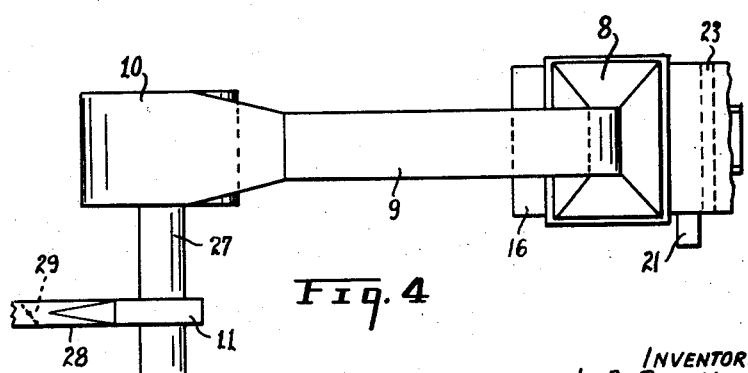

3,164,548
TOWER TYPE PNEUMATIC SEPARATOR
Lorne Archibald Rowell, Lachine, Quebec, and Peter
 Alfred Tillich, Montreal, Quebec, Canada, assignors to
 Imperial Tobacco Company of Canada Limited, Montreal, Quebec, Canada
Filed June 19, 1961, Ser. No. 117,923
Claims priority, application Canada June 15, 1961
5 Claims. (Cl. 209—139)

This invention relates to pneumatic separators and particularly to a separator for separation of heavier material from lighter material, such as, for example, the stems from fragments of tobacco leaves.

The invention consists essentially of a separating tower into the lower portion of which air is introduced through adjustable deflectors in such a way that the air velocities throughout the entire cross section of the separating tower are substantially uniform. A vibrating screen passes transversely through the separating tower, permitting the air to pass up through it into the separating chamber of the tower but preventing the heavier material separated out of the incoming product from falling to the base of the tower. The screen conveys the heavier separated material to one side of the separating chamber to a discharge mechanism which removes it from the machine. The material to be separated enters the separating chamber of the tower through an air lock which not only effectively seals off air entrance at this point, but imparts a substantial uniform velocity to the material as it enters the separating chamber. This velocity is high enough to throw the material into and across the vertically rising current of air in the separating chamber. The incoming material to be separated enters the separating chamber well above the discharge vibrating screen so that only the heavier particles reach the screen. This minimizes the effect of this material on the air velocity through the screen. The separated lighter materials float upwards in the tower on the rising currents of air and pass from the tower to a tangential separator where the material is separated from the air and is discharged through an air lock into any suitable container or conveyor system. The air is passed to a fan and is thence discharged to atmosphere or passed through a filter or returned to the air inlet of the separating tower. A suitable baffle, either on the inlet side of the fan or in the discharge side of the fan, controls the velocity of the air passing up through the separating tower.

The object of the invention is to provide a pneumatic separator in which the material to be separated is introduced into a vertical uprising current of air having uniform velocity throughout the separating chamber at the material inlet level.

A further object of the invention is to provide a separator in which the material to be separated is projected across the uprising current of air at a substantial velocity.

A further object of the invention is to provide a separator in which a screen discharge conveyor is located transversely in the separating chamber without appreciably affecting the upward flow of air passing through it.

A further object of the invention is to provide a separator in which the material to be separated is introduced into the separating chamber well above the screen conveyor.

These and other objects of the invention will be apparent from the following detailed description and the accompanying drawings, in which:

FIG. 2 is a vertical elevation of the machine in diagrammatic form showing the flow of material and air through the machine.

FIG. 3 is a vertical side elevation of the machine as shown in FIG. 2.

FIG. 4 is a plan view of the machine.

Figure 1:
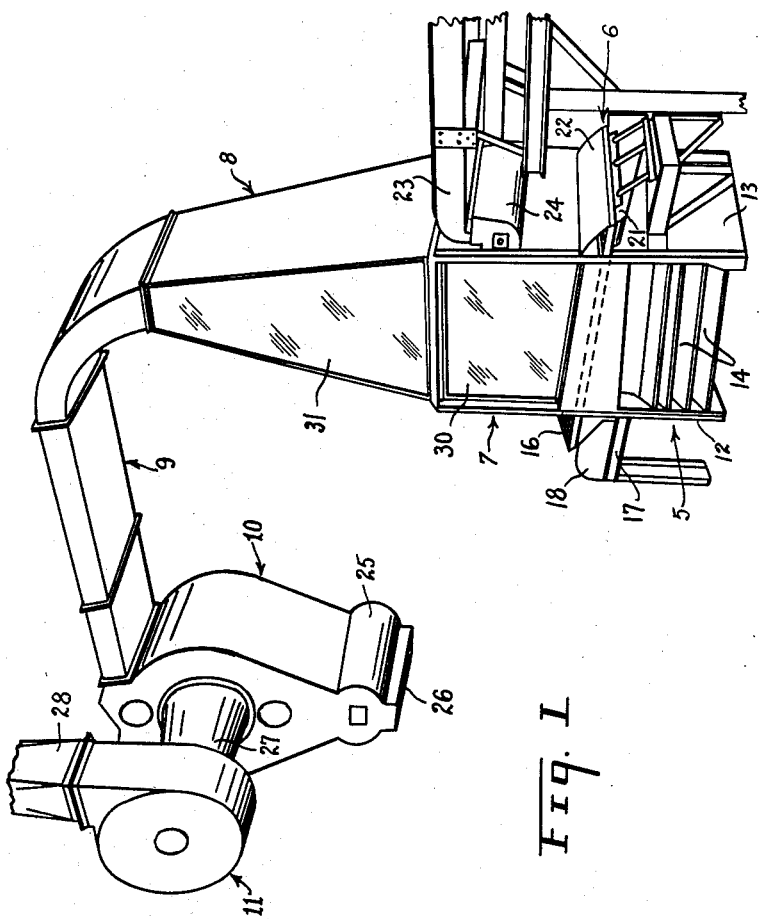
FIG. 1 is a perspective elevation of the separating machine.

Referring to the drawings, the pneumatic separator is of the tower type and consists of a lower air inlet section 5, a heavy material discharge section 6, a separating chamber 7 and a light material transformer section 8 leading through the duct 9 to the tangential separator 10 and the fan 11.

The air inlet section 5 of the separator is a rectangular structure open at front and back and having side walls 12 and 13. Located between the side walls 12 and 13 are a series of curved ducts 14 forming air inlet passages directing streams of air from front and back of the machine upwards through the separating chamber. The ducts 14 are fitted at their inlets with adjustable deflectors 15.

In FIG. 2 of the drawings the air flow is denoted by the chain dot arrows A.

The heavy material discharge section consists of a vibrating screen 16 flexibly supported on the framework 17 and vibrated by means of vibrating mechanism 18. The vibrating screen 16 passes through the slots 19 and 20 in the side walls 12 and 13 and across the path of the upward flowing air from the air inlet section 5. The screen 16 is preferably positioned at a slight angle to the horizontal in order to effect a flow of the heavier material through the slot 20 towards the discharge chute 21 located outside the wall 13. A guide or deflector plate 22 positioned above the discharge end of the screen 16 and the discharge chute 21 serves to reduce the flow of air into the separating chamber 7 through slot 20. This discharge arrangement may be replaced by any suitable air lock device to discharge the material but effectively prevent or control inlet of air at this point.

The material to be separated is fed into the separating chamber 7 through the duct 23 and rotary air lock 24 at a substantial distance above the surface of the screen 16. The air lock 24 is preferably of the paddle type which imparts to the incoming material a substantial velocity which will have the effect of projecting the heavier portions of the material across the upflowing air rather than allowing the heavier portions to fall directly onto the screen. As can be clearly seen in FIG. 2 the duct 23 has a portion curved to conform to the peripheral path of movement of the blade tips of the paddle type rotor and the portion of the duct immediately adjacent thereto is horizontal so that the impeller blades eject material through the inlet into the tower at a tangent to the blades and in a horizontal direction. As seen in FIG. 2 the inlet opening has a height which is less than one half the diameter of the impeller and this reduced height assists in maintaining the horizontal path of the material as it passes through the inlet into the tower. The duct 23 may be replaced by a combined belt and air lock arrangement where the belt would impart the required velocity to the material.

The heavier separated material is indicated in FIG. 2 by the arrows B which indicate the path of the heavier material directly across the upflow of the air stream passing through the screen 16. This heavy material, due to the velocity with which it is projected across the air stream and to the inertia force of the particles, is generally carried across to the opposite side of the separating chamber 7 from the air lock 24, well above the level of the screen 16 before dropping down onto the screen. The heavier material in being shunted across the chamber 7 does not materially interfere with the upward flow of air through the screen 16 and, when the heavier material is deposited on the screen, it is evenly distributed and again offers a minimum of obstruction to the upward flow of the air through the screen.

While a flat type screen is disclosed it could be replaced by a foraminous belt which would carry the heavier material towards the discharge chute 21 while permitting the upward flow of air through it.

The lighter separated material is indicated in FIG. 2 by the arrows C which indicate the path taken by the lighter material as it is separated from the heavier material taking the path indicated by the arrows B. This lighter material floats on the upward flowing air and is immediately separated from the heavier material and is carried upwards by the air through the material transformer section 8 of the machine and thence through the duct 9 into the tangential separator 10 where it is separated from the air and passed through the rotary air lock 25 to the discharge opening 26.

The air in the tangential separator 10 is drawn off through the duct 27 by the fan 11 and is discharged to the atmosphere through the duct 28. Alternatively, the air discharge from the fan 11 may be passed through a filter and be returned to the air inlet side of the section 5 of the machine. Any form of suitable collector could be substituted for the tangential separator.

A damper 29 in the air discharge duct 28 controls the velocity of the air passing up through the separator and so controls the separation of lighter material from the heavier material. While the damper 29 is shown installed on the discharge side of the fan 11 it could be placed on the intake side of the fan with equal effectiveness.

In order to observe the separation of the heavier material from the lighter material, the wall 30 of the separation chamber 7 and the wall 31 of the transformer section 8 are transparent. By observing the separation, the deflectors 15 and the damper 29 can be adjusted to give the desired inflow of air and control its velocity to permit optimum separation.

In the operation of this invention, the velocity of air rising vertically in the separating chamber 7 is adjusted by means of the damper 29 to provide sufficient upward force on the lighter particles being separated so that they float to the top of the transformer section 8 and be carried through the duct 9 to the tangential separator 10, but not enough to support the heavier particles.

The material to be separated enters the separating chamber 7 through the rotary air lock 24 which serves to prevent air entering at this point and also to impart a substantial uniform velocity to the material as it enters the chamber 7. This velocity is such that the heavier particles to be separated from the product have sufficient force to cross the uprising current of air towards the opposite wall 12 of the chamber 7. The lighter particles, having less inertia force and greater surface area for their weight do not travel as far across the chamber. Being light enough to be supported by the uprising current of air, they float clear of the heavier particles and are carried to the top of the transformer section 8 and from there are conveyed through the duct 9 to the tangential separator 10 from which they are discharged through the air lock 25.

The heavier particles which are to be separated from the lighter particles travel farther across the chamber 7 because of their greater inertia force and in so doing, tend to become untangled and separated from the lighter particles. Furthermore, since the upward current of air is just sufficient to float the lighter particles upwards, but not the heavier particles, the latter drop down onto the vibrating screen conveyor 16 which carries them through the slot 20 in the wall of the chamber 7 towards the discharge chute 21.

For materials which tend to tangle, the bouncing provided by the screen conveyor 16 will cause the light material to disentangle itself from the heavy material and float upwards to join the lighter material previously separated and floating upwards to the top of the transformer section 8.

For products having a high percentage of "heavies," it may not be desirable to have them return over the screen to a discharge point on the same side as the material inlet, because of their effect on the air velocity through the screen. The heavies may therefore, be discharged on either side of the machine relative to the material inlet.

What we claim is:

1. Apparatus for separating heavy and light particles from each other comprising a tower type separator having a material feed inlet, means for establishing and maintaining an upward flow of air through the tower at a predetermined velocity which is substantially uniform across the area of the tower, duct means connected to the said inlet for conveying a mixture of particles to said tower, a rotary bladed impeller in said duct means, the height of said inlet being less than one half the diameter of said impeller, a portion of the periphery of said duct means being curved to conform to the peripheral path of the blade tips of said rotary impeller and a portion of said duct means adjacent said inlet being horizontal, centrifugal force thrusting the particles against said curved duct means whereby the particles are contacted by the end portions of the impeller blades, the particles being carried by the impeller blades and being thrust along the horizontal portion of the duct means and being ejected from the duct through the inlet into the tower at a tangent to the impeller blades in a substantially horizontal direction and at a substantially uniform velocity, and means for maintaining a relationship between the velocity of the upflowing air and the velocity of travel of said particles across the tower such that the lighter particles are entrained and carried upwardly by the upflowing air while the heavier particles travel across the tower from the inlet opening towards the opposite wall of the tower and thence downwardly from the zone of separation, and means for removing the heavier particles from the tower.

2. Apparatus for separating heavy and light solid particles from each other comprising a separating tower having an air inlet and a material feed inlet located above said air inlet, said separating tower having a uniform cross sectional area throughout the length thereof, means for establishing and maintaining an upward flow of air through the tower from said air inlet at a predetermined velocity which is substantially uniform across the area of the tower, duct means connected to said material feed inlet for conveying a mixture of particles to said tower, a rotary bladed impeller in said duct means, the height of said material feed inlet being less than one half the diameter of said impeller, a portion of the periphery of said duct means being curved to conform to the peripheral path of the blade tips of said rotary impeller and a portion of said duct means adjacent said inlet being horizontal, centrifugal force thrusting the particles against said curved duct means whereby the particles are contacted by the end portions of the impeller blades, the particles being carried by the impeller blades and being thrust along the horizontal portion of the duct means and being ejected from the duct through the material feed inlet into the tower at a tangent to the impeller blades in a substantially horizontal direction and at a substantially uniform velocity whereby the lighter particles are entrained and carried upwardly by the upflowing air and the heavier particles travel across the tower and are dropped downwardly and means for causing the heavier particles to travel back across the tower to be subjected to a second separation by the upflowing air at the same predetermined velocity.

3. Apparatus for separating heavy and light solid particles from each other comprising a separating tower having an air inlet and a material feed inlet located above said air inlet, means for establishing and maintaining an upward flow of air through the tower from said air inlet at a predetermined velocity which is substantially uniform across the area of the tower, duct means connected to said material feed inlet for conveying a mixture of particles to said tower, a rotary bladed impeller in said duct means, the height of said material feed inlet being less than one half the diameter of said impeller, a portion of the periphery of said duct means being curved to conform to the peripheral path of the blade tips of said rotary impeller and a portion of said duct means adjacent said inlet being horizontal, centrifugal force thrusting the particles against said curved duct means whereby the particles are contacted by the end portions of the impeller blades, the particles being carried by the impeller blades for at least one quarter of a revolution and being ejected from the duct through the material feed inlet into the tower at a tangent to the impeller blades in a substantially horizontal direction and at a substantially uniform velocity, the relationship between the velocity of the upflowing air stream and the velocity of the particles traveling across said air stream being such that a major proportion of the material, comprising the lighter particles, is entrained and carried upwardly by the air stream while the heavier particles are caused to continue to travel across the tower from the feed inlet towards the opposite wall of the tower and thence downwardly toward the lower part of the tower, and a heavy particle discharge screen positioned to extend angularly downwardly towards the inlet side of the tower and disposed in the tower above the air inlet and at a substantial distance below the material feed inlet, said screen serving to transport the heavier components of the initial separation back across the upflowing air stream to a heavier particle outlet opening located below the material feed inlet.

4. A pneumatic separator as set forth in claim 3 in which the said tower separator includes means to separate the air from the entrained lighter particles and to discharge the lighter particles from the tower.

5. Apparatus for separating heavy and light solid particles from each other comprising a separating tower having an air inlet and a material feed inlet located above said air inlet, means for establishing and maintaining an upward flow of air through the tower from said air inlet at a predetermined velocity which is substantially uniform across the area of the tower, duct means connected to said material feed inlet for conveying a mixture of particles to said tower, a rotary bladed impeller in said duct means, the height of said material feed inlet being less than one half the diameter of said impeller, a portion of the periphery of said duct means being curved to conform to the peripheral path of the blade tips of said rotary impeller, a portion of said duct means adjacent said inlet being horizontal, centrifugal force thrusting the particles against said curved duct means whereby the particles are contacted by the end portions of the impeller blades, the particles being carried by the impeller blades for at least one quarter of a revolution and being ejected from the duct through the material feed inlet into the tower at a tangent to the impeller blades in a substantially horizontal direction and at a substantially uniform velocity, the relationship between the velocity of the upflowing air stream and the velocity of the particles traveling across said air sream being such that a major proportion of the material, comprising the lighter particles, is entrained and carried upwardly by the air stream while the heavier particles are caused to continue to travel across the tower from the feed inlet towards the opposite wall of the tower and thence downwardly toward the lower part of the tower, and means comprising a vibrating conveyor type discharge screen positioned in the tower above the air inlet and at a substantial distance below the material feed inlet, said screen serving to transport the heavier components of the initial separation back across the upflowing air stream to a heavier particle outlet opening located below the material feed inlet.

References Cited in the file of this patent

UNITED STATES PATENTS

| | | |
|---|---|---|
| 1,374,645 | Franklin | Apr. 12, 1921 |
| 1,660,682 | Stebbins | Feb. 28, 1928 |
| 1,879,107 | Couch | Sept. 27, 1932 |
| 2,135,716 | Johnson | Nov. 8, 1938 |
| 2,852,137 | Hagopian | Sept. 16, 1958 |

FOREIGN PATENTS

| | | |
|---|---|---|
| 884,549 | France | Apr. 27, 1943 |
| 969,075 | Germany | Apr. 30, 1958 |